United States Patent [19]

Takahashi et al.

[11] Patent Number: 5,324,538
[45] Date of Patent: Jun. 28, 1994

[54] PROCESS FOR PRODUCING COMPOSITE SEMIPERMEABLE MEMBRANE EMPLOYING A POLYFUNCTIONAL AMINE SOLUTION AND HIGH FLASH POINT - SOLVENT

[75] Inventors: Seriya Takahashi; Yoshishige Fujii, both of Otsu; Tadahiro Uemura, Kyoto, all of Japan

[73] Assignee: Toray Industries, Inc., Tokyo, Japan

[21] Appl. No.: 849,336

[22] Filed: Mar. 11, 1992

[30] Foreign Application Priority Data

Mar. 12, 1991 [JP] Japan ..................... 46979

[51] Int. Cl.⁵ .................................. B05D 3/04
[52] U.S. Cl. .......................... 427/245; 210/500.38; 210/500.41
[58] Field of Search ................... 427/245, 246; 210/500.37, 500.38, 500.39, 500.41, 490, 654

[56] References Cited

U.S. PATENT DOCUMENTS

| | | | |
|---|---|---|---|
| 4,277,344 | 7/1981 | Cadotte | 210/654 |
| 4,520,044 | 5/1985 | Sundet | 427/246 |
| 4,626,468 | 12/1986 | Sundet | 210/500.38 |
| 4,758,343 | 7/1988 | Sasaki et al. | 210/500.38 |
| 4,772,394 | 9/1988 | Swedo et al. | 210/500.38 |
| 4,828,708 | 5/1989 | Bray | 427/245 |
| 4,830,885 | 5/1989 | Tran et al. | 427/245 |
| 4,948,507 | 8/1990 | Tomaschke | 210/500.38 |
| 4,950,404 | 8/1990 | Chau | 264/45.5 |
| 4,983,291 | 10/1991 | Chau et al. | 210/500.37 |
| 5,015,380 | 5/1991 | Sundet | 210/500.38 |
| 5,051,178 | 9/1991 | Uemura et al. | 427/245 |

FOREIGN PATENT DOCUMENTS

| | | |
|---|---|---|
| 0085111 | 8/1983 | European Pat. Off. . |
| 0219125 | 4/1987 | European Pat. Off. . |
| 0498596 | 8/1992 | European Pat. Off. . |
| 59-179103 | 10/1984 | Japan . |
| 62-180709 | 8/1987 | Japan ............ 210/500.37 |
| 63-287507 | 11/1988 | Japan ................ 210/490 |
| 2139113 | 11/1984 | United Kingdom . |
| 2199786 | 7/1988 | United Kingdom ...... 210/500.41 |

Primary Examiner—Terry J. Owens
Attorney, Agent, or Firm—Fish & Richardson

[57] ABSTRACT

A process of producing a composite semipermeable membrane which includes applying a polyfunctional amine solution and a polyfunctional acid halide solution in a hydrocarbon-based solvent having a flash point of not lower than 10° C. on a surface of a microporous substrate to allow interfacial polycondensation reaction so as to form a cross-linked polyamide-based ultra-thin membrane superposed on the microporous substrate, then blowing a gas on the surface of the ultra-thin membrane so as to evaporate the hydrocarbon-based solvent, which gas has a velocity at the surface of 2-20 m/sec., a temperature of 10°-80° C. that is lower than the flash point of the hydrocarbon-based solvent, and an absolute humidity of not less than 1 g of water per 1 kg of dry gas.

37 Claims, No Drawings

PROCESS FOR PRODUCING COMPOSITE SEMIPERMEABLE MEMBRANE EMPLOYING A POLYFUNCTIONAL AMINE SOLUTION AND HIGH FLASH POINT - SOLVENT

BACKGROUND OF THE INVENTION

I. Field of the Invention

This invention relates to processes for producing composite semipermeable membranes useful for selective separation of solutes in solutions. More particularly, the present invention relates to processes for producing cross-linked polyamide-based composite semipermeable membranes suited for desalination of sea water and brackish water.

II. Description of the Related Art

There are a number of techniques for removing a substance (e.g., salt) in a solvent (e.g., water). Among these, a separation technique utilizing reverse osmosis is drawing attention as an energy-saving and resources-saving technique. This technique is useful for preparing water for industrial, agricultural or home use by the desalination of sea water or brackish water. According to this technique, desalinated water can be produced by permeating salt-containing water through a reverse osmosis membrane by applying to the water a pressure higher than the osmotic pressure. For example, drinking water can be prepared by this technique from sea water, sewage or brackish water. This technique is also employed for the production of ultrapure water for industrial use, disposal of waste water and for concentration and recovery of useful substances.

As the membrane used for the reverse osmosis process, at first, cellulose acetate membrane developed by Loeb and Sourirajan was mainly used ("Sea Water Demineralization by means of an Osmotic Membrane", in Advances in Chemistry Series #38, American Chem. Soc., Washington D.C. (1963)). Although this membrane is advantageous in that it has an excellent fundamental performance and the production thereof is simple, the salt rejection and water flux are insufficient for producing water with higher purity. Further, when the membrane is used for a long period, the membrane may be degraded by the generation of microorganisms on its surface and the membrane may likely be degraded by hydrolysis. This membrane is so called an asymmetric membrane which is prepared by a method called phase inversion method. In this membrane, a dense layer which mainly decides the separation performance and a microporous layer reinforcing the dense layer are made of the same material. To overcome the drawbacks of the cellulose acetate membrane, asymmetric reverse osmosis membranes made of synthetic polymers such as aromatic polyamides have been proposed (U.S. Pat. No. 3,567,632). However, although the degradation of the membrane by microorganisms is improved in this membrane, the reverse osmosis performance is not adequately improved. Thus, drastic improvement in the performance of the reverse osmosis membrane has been demanded.

In response to this demand from the industries, a method for preparing a reverse osmosis membrane by preliminarily providing a microporous substrate and a hydrophilic reactive polymer and/or monomer is reacted with a cross-linking agent on the substrate so as to form a very thin dense layer was proposed. It was suggested that by this method, a reverse osmosis membrane with much improved fundamental performance as well as with much improved resistance to hydrolysis, resistance to microorganisms, resistance to compression and improved shelf life in a dry state may be obtained. Such membranes are called composite membranes. Due to their excellent performance, this type of membranes are now being widely used. The first membrane of this type was developed by North Star Research in the U.S., which is prepared by impregnating a polysulfone microporous substrate as the microporous substrate with polyethyleneimine and cross-linking the polyethyleneimine by toluenediisocyanate (U.S. Pat. No. 4,039,440). It turned out that the cross-linked layer of this membrane is very weak because the amine content of polyethyleneimine is too large, so that it has poor ease of handling in, for example, preparing a module using this membrane. To overcome this drawback, Universal Oil Products developed a membrane which is prepared by employing an amine-modified polyepichlorohydrine as the hydrophilic reactive polymer (U.S. Pat. No. 3,951,815). However, it turned out that by this method, it is difficult to obtain a membrane with a large water flux and that the membrane is poor in durability.

While the above-mentioned composite membranes employ reactive polymers for the formation of the cross-linked layers, Filmtech developed a composite membrane which is prepared by using a reactive monomer (U.S. Pat. No. 3,926,798). This membrane is so called cross-linked polyamide-based composite membrane, which is prepared by impregnating a polysulfone-based microporous substrate with aqueous solution of a polyfunctional amine such as m-phenylenediamine or p-phenylenediamine, and by applying to the surface of the substrate a solution of a polyfunctional acid halide so as to cross-link the above-mentioned amine. This cross-linked polyamide-based composite membrane has the best performance among the known reverse osmosis membranes and can satisfy the strict demands from the users. This type of membrane has been published by several companies (U.S. Pat. Nos. 4,626,468 and 4,830,885, Japanese Laid-open Patent Applications (Kokai) Nos. 60-185903 and 2-187135).

However, this cross-linked polyamide-based composite membrane has a critical drawback in its production process. That is, as the solvent of the polyfunctional acid halide, a solvent such as hexane or trichlorotrifluoroethane is used. Hexane has a low flash point and low boiling point, so that sufficient safe measures must be taken for preventing explosion or fire in storage or the like. This is very disadvantageous from the view point of industrial applications. On the other hand, chlorofluorocarbon solvents such as trichlorotrifluoroethane has high safety and membranes with good performance can be easily produced by using these solvents, so that they are most widely used. However, the use of chlorofluorocarbons is now a grave issue since they destroy the environment on a global scale. Chlorofluorocarbons are very characteristic that they are nonflammable, non-toxic, easily vaporized and liquefied, and they have appropriate lipophilicity, so that they have a number of uses such as cleaning solvents, coolants, foaming agents and the like. However, it has been pointed out that chlorofluorocarbons destroy ozone layer in the stratosphere, so that a negative influence may be given to the earth. At present, among the lights emitted from the sun, those having wavelengths shorter than about 300 nm do not arrive at the earth since they are absorbed by the ozone layer. Since these ultraviolet lights have strong energies, they are very harmful to the ecological system. Thus, it is apparent that destruction of the ozone layer gives critical influences to all living things on the earth. In view of this, in response to the appeal by UNEP (United Nations Environment Planning), Vienna Convention for the Protection of the Ozone Layer (1985), Montreal Protocol (1987) and Helsinki Declaration (1989) have been instituted. Thus, use of chlorofluorocarbons will be restricted on a world wide scale. For example, Helsinki Declaration prohibits the production and consumption of all kinds of chlorofluorocarbons used in industries by A.D. 2000.

In view of this situation, it is necessary to urgently develop a process for producing a composite membrane, which does not employ chlorofluorocarbons. Further, it is desired to develop a process which employs a solvent that may easily be recovered and that is safe in handling. An example of the process for producing composite semipermeable membranes, which employs a chlorofluorocarbon, is the method disclosed in Japanese Patent Publication (Kokoku) No. 63-36803 in which m-phenylenediamine or p-phenylenediamine is cross-linked by trimesoyl chloride or isophthaloyl chloride on a polysulfone substrate. In this process, trichlorotrifluoroethane is used as the solvent of the acid chloride. Similarly, a method is disclosed in Japanese Laid-open Patent Application (Kokai) No. 1-130707 in which piperazine is employed as the amine. In this method too, trichlorotrifluoroethane is used as the reaction solvent.

In looking for a substitute solvent for chlorofluorocarbons, in addition to that the solvent does not substantially destruct the ozone layer, the safety in handling should also be taken into consideration. Japanese Laid-open Patent Application No. 62-49909 discloses a method in which a polysulfone microporous substrate is used as the substrate and polyvinyl alcohol and an amino compound such as piperazine are simultaneously cross-linked with trimesoyl chloride. In this method, as the solvent of trimesoyl chloride, a low boiling hydrocarbon such as n-hexane or cyclohexane is used. Although low boiling hydrocarbons do not destroy the ozone layer, most of them have flash points below 0° C., so that they are very flammable and very dangerous in handling. This is a critical problem in industrial scale production. Further, since they have low boiling points, recovery of them is difficult, so that the non-recovered vapor of the solvent is released into the atmosphere, which causes air pollution. Since there is a step of evaporating the solvent after the polyfunctional acid halide solution is contacted with the reactive monomer or polymer in the production process of the composite membrane utilizing an interfacial polycondensation reaction on the substrate, it is hitherto thought that the boiling point of the solvent should be more or less low. However, solvents having low or medium boiling points have low flash points accordingly, so that they cannot satisfy the above-described demand of safety. Japanese Laid-open Patent Application (Kokai) No. 59-179103 and Japanese Patent Publication (Kokoku) No. 63-36803 exemplify high boiling solvents as preferred solvents for the cross-linking agent in addition to the low boiling solvents such as n-hexane and trichlorotrifluoroethane. The present inventors experimentally produced composite membranes exactly following the methods described in these references. As a result, although composite membranes with the described performance were obtained when a low boiling solvent was used, if a high boiling solvent was used, only membranes having extremely low water flux were obtained. In the references, it is described that the evaporation of the solvent may be carried out under heat, if required. However, it was experimentally confirmed that even if the evaporation of the solvent is carried out in heated atmosphere, only membranes having extremely low water flux can be obtained.

SUMMARY OF THE INVENTION

Accordingly, an object of the present invention is to provide a process for producing a composite semipermeable membrane with high reverse osmosis performance (separation performance and water flux) in which a solvent which does not destroy the ozone layer, which has a high flash point and so is safe in handling is used.

The present inventors intensively studied to find that the above-mentioned object may be attained by employing a high boiling hydrocarbon solvent and by evaporating the solvent by blowing to the surface of the membrane humid gas with a specific temperature at a specific velocity, thereby completing the present invention.

That is, the present invention provides a process for producing a composite semipermeable membrane comprising the steps of applying a polyfunctional amine solution and a polyfunctional acid halide solution on a surface of a microporous substrate to allow interfacial polycondensation reaction so as to form a cross-linked polyamide-based ultra-thin membrane superposed on said microporous substrate, the solvent of said polyfunctional acid halide solution being a hydrocarbon-based solvent with a flash point of not lower than 10° C.; and thereafter blowing a gas on said surface of said ultra-thin membrane so as to evaporate said hydrocarbon-based solvent, which gas has a velocity at said surface of 2–20 m/sec., a temperature of 10°–80° C. that is lower than the flash point of said hydrocarbon-based solvent, and an absolute humidity of not less than 1 g of water per 1 kg of dry gas.

By the present invention, a process for producing a composite semipermeable membrane with high reverse osmotic performance in which a solvent which does not destruct the ozone layer, which has a high flash point and so is safe in handling is used, was provided.

DETAILED DESCRIPTION OF THE PREFERRED EMBODIMENTS

The microporous substrate employed in the present invention may preferably have an asymmetric structure along the cross-sectional direction. The microporous substrate may preferably have micropores of which average pore size at the surface of the substrate is 2–500 nm, more preferably 3–30 nm. The microporous substrate may preferably have a thickness of 10–300 μm, still more preferably 30–200 μm. Preferred examples of the material mainly constituting the microporous substrate include polysulfones, polyethersulfones, polyacrylonitriles, cellulose esters, polyphenyleneoxides, polypropylenes, polyvinyl chlorides, polyphenylenesulfidesulfones, polyphenylenesulfones and the like. The microporous substrate may be in the form of a flat membrane or in the form of hollow fiber or tube. The microporous substrate may be reinforced by a woven fabric or a non-woven fabric. Preferred examples of the material constituting the woven fabric or non-woven fabric include polyesters, polypropylenes, polyamides, polyacrylonitriles, regenerated celluloses and acetyl celluloses. In cases where a non-woven fabric is employed, the non-woven fabric may preferably have a weight of 40–200 g/m$^2$. A non-woven fabric having a weight less than this range is not preferred since sufficient reinforcing effect may not be obtained and the polymer solution cast thereon in the production process of the substrate may permeate to the backside.

The microporous membrane may be prepared, for example, by casting 12–25 wt % polysulfone solution in dimethylformamide onto a fabric such as non-woven fabric and immersing the resultant in a coagulation bath. The coagulation bath may preferably contain water or a mixture of water and a solvent. The support on which the polysulfone solution is cast may be immersed in the coagulation bath after evaporating the solvent for a prescribed time. In this case, the time for evaporating the solvent may preferably be 0–60 minutes, more preferably 1–10 minutes. The temperature of the atmosphere in which the evaporation of the solvent is carried out may preferably be 0° C. to the boiling point of the solvent, more preferably 5° C. to (boiling point of the solvent minus 50° C.).

Although the produced microporous substrate may be stored in pure water, it is preferred to store the microporous substrate in 1–10 ppm aqueous sodium hypochlorite in order to prevent the generation of microorganisms.

The polyfunctional amine employed in the process of the present invention is an aliphatic, aromatic, heterocyclic or alicyclic compound which has two or more primary or secondary amino groups in one molecule. The polyfunctional amine may preferably have a solubility to water of not less than 0.1% by weight at room temperature. Preferred examples of the polyfunctional amine include m-phenylenediamine, p-phenylenediamine, piperazine, 2-methylpiperazine, N,N-dimethylethylenediamine, 1,3,5-triaminobenzene and the like as well as mixtures thereof.

The polyfunctional amine may preferably be in the form of aqueous solution when applied to the surface of the microporous substrate. Pure water is preferred as the solvent. Since the solvent should not contain a substance which adversely affect the reaction between the amine and the acid halide, distilled water or permeated water obtained by reverse osmosis may preferably be employed.

The concentration of the aqueous polyfunctional amine solution may preferably be 0.5–5% by weight. In cases where hydrochloric acid or the like is formed by the reaction between the polyfunctional amine and acid halide, a trapping agent thereof such as sodium hydroxide, sodium carbonate or sodium phosphate may be contained in the aqueous polyfunctional amine solution.

The polyfunctional acid halide employed in the process of the present invention is an aliphatic, aromatic, heterocyclic or alicyclic compound having two or more acyl halide groups in one molecule. Preferred examples of the polyfunctional acid halide include isophthaloyl chloride, terephthaloyl chloride, trimesoyl chloride, 1,2,4-benzenetricarboxylic acid trichloride and the like.

The solvent employed for formulating a solution of the polyfunctional acid halide (cross-linking agent solution) has a flash point of not lower than 10° C. The solvent may preferably have a boiling point of not higher than 300° C., more preferably not higher than 220° C. The solvent may preferably have a heat of vaporization at its boiling point of 60–78 cal/g. The solvent should not damage the microporous substrate and should enable the production of a high performance composite membrane. In cases where the composite membrane is prepared by utilizing the interfacial polycondensation between an aromatic amine and an aromatic acid halide, the term "high performance composite membrane" means that the membrane has a reverse osmosis performance such that the salt rejection is not less than 90% and the water flux is not less than 0.4 m$^3$/m$^2$.day when 500–2000 ppm aqueous NaCl solution is treated at 25° C. under a pressure of 50–60 kg/cm$^2$.

If the flash point of the solvent is lower than 10° C., the handling of the solvent is dangerous. A solvent having a boiling point of higher than 300° C. is not preferred not only because the time required for evaporating the solvent is extremely long but also the performance of the resulting membrane may be lowered. A solvent having a heat of vaporization larger than 78 cal/g at its boiling point is not preferred since the time required for evaporating the solvent is extremely long. On the other hand, a solvent having a heat of vaporization smaller than 60 cal/g at its boiling point is not preferred since the temperature in the vicinity of the surface of the substrate may be lowered by the rapid evaporation of the solvent so that moisture forms dew, thereby hindering the interfacial polycondensation. Preferred solvent includes saturated aliphatic hydrocarbons having about not less than 8 carbon atoms and alicyclic hydrocarbons. Monoolefins having not less than 8 carbon atoms may also preferably be employed. Solvents containing halogen atoms and solvents having high polarities are not preferred since the performance of the resulting membrane may be degraded and the substrate may be damaged. Specific preferred examples of the hydrocarbon solvents include n-octane, n-nonane, n-decane, n-undecane, n-dodecane, cyclooctane, ethylcyclohexane, 1-octene and 1-decene as well as mixtures thereof. It should be noted that the boiling points of these solvents are higher than the boiling solvent of water. As long as the advantageous features of the present invention are not degraded, a solvent other than the above-described hydrocarbon solvent may be contained in the hydrocarbon solvent in a small amount not adversely affecting the advantageous features of the present invention.

The concentration of the cross-linking agent solution (polyfunctional acid halide solution) may preferably be 0.01–1% by weight. A concentration lower than 0.01% by weight is not preferred since the cross-linked polyamide-based ultra-thin layer may not be well formed so that the salt rejection may be low. On the other hand, a concentration higher than 1% by weight is not preferred since the water flux may be low.

The time for applying the cross-linking agent solution on the surface of the microporous substrate may preferably be 10 seconds to 5 minutes. Applying the cross-linking agent solution for more than 5 minutes is not preferred since a thick cross-linked polyamide layer is formed so that the water flux may be reduced.

After applying the cross-linking agent solution, it is necessary to evaporate the solvent of the cross-linking agent solution. By gradually evaporating the solvent, the concentration of the cross-linking agent is gradually increased so as to promote the cross-linking reaction, and the cross-linking reaction completes when the solvent is completely evaporated. If the time required for the evaporation of the solvent is too long, the reaction proceeds for a long time, so that a thick cross-linked polyamide layer is formed. As a result, the water flux of the membrane may be small.

In the process of the present invention, a gas with a temperature of 10°-80° C., preferably 20°-40° C. which is lower than the flash point of the solvent of the cross-linking agent solution is blown to the surface of the microporous substrate at a velocity of 2-20 m/sec., preferably 3-10 m/sec. The temperature and velocity of the gas are measured at a height of 10 mm from the surface of the microporous substrate. If the temperature or the velocity of the gas is lower than the above-described range, the efficiency of the evaporation is lowered, so that the performance of the resulting membrane may be lowered. On the other hand, if the temperature or the velocity of the gas is higher than the above-described range, the amine may be oxidized and shrinkage of the microporous substrate may be caused by the excess evaporation of water, so that the water flux of the resulting membrane may be reduced.

As the gas for evaporating the solvent, nitrogen or a gas containing not less than 70% by volume of nitrogen, such as air, may preferably be employed.

To prevent the excess evaporation of water in the membrane, it is important that the gas blown to the surface of the substrate have sufficient humidity. That is, the gas has an absolute humidity of not less than 1 g of water, preferably not less than 7 g of water per 1 kg of dry gas. The upper limit of the humidity is saturation.

As stated above, the preferred hydrocarbon solvents which may be employed as the solvent of the cross-linking agent solution have boiling points higher than the boiling point of water. Thus, if the evaporation of the solvent is carried out by only raising the temperature of atmosphere, excess evaporation of water in the membrane tends to occur before completion of the evaporation of the solvent, so that the performance of the resulting membrane may be lowered.

For the safety in handling, it is important that the temperature of the gas blown be lower than the flash point of the solvent of the cross-linking agent. If the temperature of the gas is higher than the flash point of the solvent, it is dangerous. The formation of the cross-linked polyamide-based ultra-thin membrane may preferably be carried out at a temperature at which the vapor pressure of the hydrocarbon solvent is 0.0001-0.02 kg/cm². A vapor pressure higher than this range is not preferred since the evaporation of the solvent may be so slow that a membrane with high performance may not be obtained. On the other hand, a vapor pressure lower than this range is not preferred since it is dangerous, especially when the process is carried out in an industrial scale.

After the evaporation of the solvent, it is preferred to sufficiently wash the membrane with water to remove non-reacted acid halide.

The invention will now be described by way of examples thereof. It should be noted that the examples are presented for the illustration purpose only and should not be interpreted in any restrictive way.

In all of the following examples, the evaporation of the solvent on the surface of the microporous substrate was carried out by blowing air thereto. Unless otherwise specified, the air had an absolute humidity of 18-23 g of water per 1 kg of dry air.

The reverse osmosis performance of the prepared membranes was evaluated by supplying 1500 ppm aqueous sodium chloride solution at 25° C. under a pressure of 15 kg/cm² and by measuring the salt rejection and water flux. The salt rejection was calculated according to the following equation:

$$\text{Salt Rejection (\%)} = \left(1 - \frac{B}{A}\right) \times 100$$

wherein A represents the concentration of NaCl in the feed solution and B represents the concentration of NaCl in the permeate.

EXAMPLE 1

On a polyester taffeta, 15 wt % polysulfone solution in dimethylformamide was cast to a thickness of about 100 μm and the resultant was immediately immersed in water bath at room temperature so as to gel the polysulfone solution, thereby obtaining a woven fabric-reinforced polysulfone microporous substrate. The thus obtained polysulfone microporous substrate was sufficiently washed with water so as to exchange the solvent in the substrate with water.

The thus obtained polysulfone microporous substrate was immersed in an aqueous m-phenylenediamine solution (concentration: 1.0% by weight) for one minute and then taken out from the solution. After removing the liquid drops on the surface of the substrate, a solution of trimesoyl chloride (concentration: 0.1% by weight, solvent: ethylcyclohexane) was applied to the surface of the substrate for one minute. To evaporate the solvent remaining on the surface of the substrate, air at 80° C. was blown to the surface of the substrate for 15 seconds at a velocity of 6 m/sec. The thus prepared composite membrane was washed with flowing water for 20 minutes to remove the non-reacted acid chloride.

The thus prepared composite semipermeable membrane had a salt rejection-water flux of 99.3%–0.68 m³/m².day. Thus, the membrane had a high reverse osmosis performance.

EXAMPLE 2

The polysulfone microporous substrate prepared in Example 1 was immersed in aqueous piperazine solution (concentration: 5% by weight) for one minute and the substrate was then removed from the solution. After removing the liquid drops on the surface of the substrate, a solution of trimesoyl chloride (concentration: 0.5% by weight, solvent: cyclooctane) was applied to the surface of the substrate for two minutes. To evaporate the solvent remaining on the surface of the substrate, air at 20° C. was blown to the surface of the substrate for one minute at a velocity of 20 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 73.0%–0.98 m³/m².day.

EXAMPLE 3

The polysulfone microporous substrate prepared in Example 1 was immersed in aqueous m-phenylenediamine solution (concentration: 3% by weight) for one minute and the substrate was then removed from the solution. After removing the liquid drops on the surface of the substrate, a solution of trimesoyl chloride (concentration: 0.1% by weight, solvent: n-octane) was applied to the surface of the substrate for one minute. To evaporate the solvent remaining on the surface of the substrate, air at 25° C. was blown to the surface of the substrate for one minute at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.5%–1.06 $m^3/m^2$.day.

EXAMPLE 4

The polysulfone microporous substrate prepared in Example 1 was immersed in aqueous N,N-dimethylethylenediamine solution (concentration: 2% by weight) for one minute and the substrate was then removed from the solution. After removing the liquid drops on the surface of the substrate, a solution of trimesoyl chloride (concentration: 0.05% by weight, solvent: n-nonane) was applied to the surface of the substrate for one minute. To evaporate the solvent remaining on the surface of the substrate, air at 10° C. was blown to the surface of the substrate for one minute at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 68.3%–1.06 $m^3/m^2$.day.

EXAMPLE 5

The polysulfone microporous substrate prepared in Example 1 was immersed in an aqueous mixed solution of m-phenylenediamine and triaminobenzene (molar ratio: 50/50, total amine concentration: 2% by weight) for one minute and the substrate was then removed from the solution. After removing the liquid drops on the surface of the substrate, a mixed solution of trimesoyl chloride and terephthaloyl chloride (molar ratio: 50/50, concentration: 0.1% by weight, solvent: n-decane) was applied to the surface of the substrate for one minute. To evaporate the solvent remaining on the surface of the substrate, air at 30° C. was blown to the surface of the substrate for one minute at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.6%–1.04 $m^3/m^2$.day.

EXAMPLE 6

The polysulfone microporous substrate prepared in Example 1 was immersed in aqueous triaminobenzene solution (concentration: 3% by weight) for one minute and the substrate was then removed from the solution. After removing the liquid drops on the surface of the substrate, a solution of terephthaloyl chloride (concentration: 0.1% by weight, solvent: n-undecane) was applied to the surface of the substrate for one minute. To evaporate the solvent remaining on the surface of the substrate, air at 30° C. was blown to the surface of the substrate for two minutes at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.5%–0.95 $m^3/m^2$.day.

EXAMPLE 7

The polysulfone microporous substrate prepared in Example 1 was immersed in aqueous p-phenylenediamine solution (concentration: 2% by weight) for one minute and the substrate was then removed from the solution. After removing the liquid drops on the surface of the substrate, a solution of trimesoyl chloride (concentration: 0.1% by weight, solvent: n-dodecane) was applied to the surface of the substrate for one minute. To evaporate the solvent remaining on the surface of the substrate, air at 30° C. was blown to the surface of the substrate for three minutes at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.4%–0.85 $m^3/m^2$.day.

EXAMPLE 8

The polysulfone microporous substrate prepared in Example 1 was immersed in aqueous p-phenylenediamine solution (concentration: 3% by weight) for one minute and the substrate was then removed from the solution. After removing the liquid drops on the surface of the substrate, a solution of trimesoyl chloride (concentration: 0.1% by weight, solvent: 1-octene) was applied to the surface of the substrate for one minute. To evaporate the solvent remaining on the surface of the substrate, air at 30° C. was blown to the surface of the substrate for two minutes at a velocity of 6 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 98.1%–1.17 $m^3/m^2$.day.

EXAMPLE 9

The polysulfone microporous substrate prepared in Example 1 was immersed in aqueous triaminobenzene solution (concentration: 3% by weight) for one minute and the substrate was then removed from the solution. After removing the liquid drops on the surface of the substrate, a solution of terephthaloyl chloride (concentration: 0.1% by weight, solvent: 1-decene) was applied to the surface of the substrate for one minute. To evaporate the solvent remaining on the surface of the substrate, air at 30° C. was blown to the surface of the substrate for one minute at a velocity of 6 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.2%–0.82 $m^3/m^2$.day.

EXAMPLE 10

On a polyester taffeta, 18 wt % polyethersulfone solution in dimethylformamide was cast to a thickness of about 100 μm and the resultant was immediately immersed in water bath at room temperature so as to gel the polyethersulfone solution, thereby obtaining a polyethersulfone microporous substrate. The thus obtained polyethersulfone microporous substrate was sufficiently washed with water so as to exchange the solvent in the substrate with water.

The thus prepared polyethersulfone microporous substrate was immersed in aqueous m-phenylenediamine solution (concentration: 4% by weight) for one minute and the substrate was then removed from the solution. After removing the liquid drops on the surface of the substrate, a solution of trimesoyl chloride (concentration: 0.1% by weight, solvent: ethylcyclohexane) was applied to the surface of the substrate for one minute. To evaporate the solvent remaining on the surface of the substrate, air at 30° C. was blown to the surface of the substrate for one minute at a velocity of 6 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 98.8%–1.12 $m^3/m^2$.day.

EXAMPLE 11

The polyethersulfone microporous substrate prepared in Example 10 was immersed in aqueous m-phenylenediamine solution (concentration: 4% by weight) for one minute and the substrate was then removed from the solution. After removing the liquid drops on the surface of the substrate, a solution of trimesoyl chloride (concentration: 0.1% by weight, solvent: n-decane) was applied to the surface of the substrate for one minute. To evaporate the solvent remaining on the surface of the substrate, air at 30° C. was blown to the surface of the substrate for one minute at a velocity of 6 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 98.9%–1.21 $m^3/m^2$.day.

EXAMPLE 12

On a polyester non-woven fabric (weight: 120 g/m²), 20 wt % polyphenylenesulfide sulfone solution in 1,3-dimethyl-2-imidazolidinone was cast to a thickness of about 100 μm and the resultant was immediately immersed in water bath at room temperature so as to gel the polyphenylenesulfide sulfone solution, thereby obtaining a polyphenylenesulfide sulfone microporous substrate. The thus obtained polyphenylenesulfide sulfone microporous substrate was sufficiently washed with water so as to exchange the solvent in the substrate with water.

The thus prepared polyphenylenesulfide sulfone microporous substrate was immersed in aqueous m-phenylenediamine solution (concentration: 2% by weight) for one minute and the substrate was then removed from the solution. After removing the liquid drops on the surface of the substrate,. a solution of trimesoyl chloride (concentration: 0.2% by weight, solvent: ethylcyclohexane) was applied to the surface of the substrate for one minute. To evaporate the solvent remaining on the surface of the substrate, air at 30° C. was blown to the surface of the substrate for one minute at a velocity of 6 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.0%–0.72 $m^3/m^2$.day.

COMPARATIVE EXAMPLE 1

The polysulfone microporous substrate prepared in Example 1 was immersed in an aqueous m-phenylenediamine solution (concentration: 1.0% by weight) for one minute and then taken out from the solution. After removing the liquid drops on the surface of the substrate, a solution of trimesoyl chloride (concentration: 0.1% by weight, solvent: ethylcyclohexane) was applied to the surface of the substrate for one minute. To evaporate the solvent remaining on the surface of the substrate, the substrate was left to stand for 5 minutes in a drier at 60° C. in which air was not blown. The thus prepared composite membrane was washed with flowing water for 20 minutes to remove the non-reacted acid chloride.

The reverse osmosis performance of the thus prepared composite membrane was evaluated. The membrane had a salt rejection—water flux of 89.1%–0.42 $m^3/m^2$.day Thus, the salt rejection and water flux of this composite membrane were lower than those of the membrane prepared in Example 1 in spite of the fact that the production conditions were exactly the same as in Example 1 except for the method of evaporating the solvent.

COMPARATIVE EXAMPLE 2

The polysulfone microporous substrate prepared in Example 1 was immersed in a mixed solvent of m-phenylenediamine and triaminobenzene (molar ratio: 50/50, total amine concentration: 2% by weight) for one minute and then taken out from the solution. After removing the liquid drops on the surface of the substrate, a mixed solution of trimesoyl chloride and terephthaloyl chloride (molar ratio: 50/50, concentration: 0.1% by weight, solvent: n-decane) was applied to the surface of the substrate for one minute. To evaporate the solvent remaining on the surface of the substrate, the substrate was left to stand for 5 minutes in a drier at 60° C. in which air was not blown. The thus prepared composite membrane was washed with flowing water for 20 minutes to remove the non-reacted acid chloride.

The reverse osmosis performance of the thus prepared composite membrane was evaluated. The membrane had a salt rejection—water flux of 90.2%–0.51 $m^3/m^2$.day. Thus, the salt rejection and water flux of this composite membrane were lower than those of the membrane prepared in Example 5 in spite of the fact that the production conditions were exactly the same as in Example 5 except for the method of evaporating the solvent.

COMPARATIVE EXAMPLE 3

The polysulfone microporous substrate prepared in Example 1 was immersed in an aqueous p-phenylenediamine solution (concentration: 3% by weight) for one minute and then taken out from the solution. After removing the liquid drops on the surface of the substrate, a solution of trimesoyl chloride (concentration: 0.1% by weight, solvent: 1-octene) was applied to the surface of the substrate for one minute. To evaporate the solvent remaining on the surface of the substrate, the substrate was left to stand for 5 minutes in a drier at 60° C. in which air was not blown. The thus prepared composite membrane was washed with flowing water for 20 minutes to remove the non-reacted acid chloride.

The reverse osmosis performance of the thus prepared composite membrane was evaluated. The membrane had a salt rejection—water flux of 82.3%–0.56 $m^3/m^2$.day. Thus, the salt rejection and water flux of this composite membrane were lower than those of the membrane prepared in Example 8 in spite of the fact that the production conditions were exactly the same as in Example 8 except for the method of evaporating the solvent.

COMPARATIVE EXAMPLE 4

The polysulfone microporous substrate prepared in Example 1 was immersed in an aqueous mixed solution of m-phenylenediamine and triaminobenzene (molar ratio:50/50, total amine concentration: 2% by weight) for one minute and the substrate was then removed from the solution. After removing the liquid drops on the surface of the substrate, a mixed solution of trimesoyl chloride and terephthaloyl chloride (molar ratio: 50/50, concentration: 0.1% by weight, solvent: n-decane) was applied to the surface of the substrate for one minute. To evaporate the solvent remaining on the surface of the substrate, air at 30° C. having an absolute humidity of 0.15 g water per 1 kg of dry air was blown to the surface of the substrate for one minute at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.7%–0.78 $m^3/m^2$.day. Thus, the water flux of this composite membrane was lower than that of the membrane prepared in Example 5 in spite of the fact that the production conditions were exactly the same as in Example 5 except for the method of evaporating the solvent.

COMPARATIVE EXAMPLE 5

The polysulfone microporous substrate prepared in Example 1 was immersed in aqueous m-phenylenediamine solution (concentration: 3% by weight) for one minute and the substrate was then removed from the solution. After removing the liquid drops on the surface of the substrate, a solution of trimesoyl chloride (concentration: 0.1% by weight, solvent: n-octane) was applied to the surface of the substrate for one minute. To evaporate the solvent remaining on the surface of the substrate, air at 25° C. having an absolute humidity of 0.15 g water per 1 kg of dry air was blown to the surface of the substrate for one minute at a velocity of 10 m/sec. The thus prepared composite membrane was washed with flowing water for 20 minutes to remove the non-reacted acid chloride.

The reverse osmosis performance of the thus prepared composite membrane was evaluated. The membrane had a salt rejection—water flux of 99.5%–0.80 $m^3/m^2$.day. Thus, the water flux of this composite membrane was lower than that of the membrane prepared in Example 3 in spite of the fact that the production conditions were exactly the same as in Example 3 except for the method of evaporating the solvent.

Although the invention was described by way of preferred embodiments thereof, it is apparent for those skilled in the art that various modifications may be made without departing from the spirit and scope of the present invention.

We claim:

1. A process for producing a composite semipermeable membrane comprising the steps of:
   applying a polyfunctional amine solution and a polyfunctional acid halide solution on a surface of a microporous substrate to allow interfacial polycondensation reaction so as to form a cross-linked polyamide-based ultra-thin membrane superposed on said microporous substrate, the solvent of said polyfunctional acid halide solution being a hydrocarbon solvent with a flash point of not lower than 10° C.; and
   thereafter blowing a gas on said surface of said ultra-thin membrane so as to evaporate said hydrocarbon solvent, wherein the gas has a velocity at said surface of 2–20 m/sec., a temperature of 10°–80° C. that is lower than the flash point of said hydrocarbon solvent, and an absolute humidity of not less than 1 g of water per 1 kg of dry gas.

2. The process of claim 1, wherein said microporous substrate is mainly made of at least one material selected from the group consisting of polyethersulfones, polyphenylenesulfidesulfones and polysulfones.

3. The process of claim 2, wherein said microporous substrate is mainly made of a polyethersulfone.

4. The process of claim 2, wherein said microporous substrate is mainly made of a polyphenylenesulfidesulfone.

5. The process of claim 1, wherein said microporous substrate is mainly made of a polysulfone.

6. The process of claim 1, wherein said microporous substrate has an asymmetric structure.

7. The process of claim 1, wherein said microporous substrate is reinforced with a woven-fabric or a non-woven fabric.

8. The process of claim 7, wherein said woven fabric or non-woven fabric is comprised of at least one material selected from the group consisting of polyesters, polypropylenes, polyamides, polyacrylonitriles, regenerated celluloses and acetylcelluloses.

9. The process of claim 7, wherein said woven fabric is a taffeta made of a polyester.

10. The process of claim 7, wherein said non-woven fabric is a polyester having a weight of from 40–200 $g/m^2$.

11. The process of claim 1, wherein said polyfunctional amine is m-phenylenediamine, p-phenylenediamine, triaminobenzene, piperazine or a mixture thereof.

12. The process of claim 11, wherein said polyfunctional amine is m-phenylenediamine.

13. The process of claim 11, wherein said polyfunctional amine is p-phenylenediamine.

14. The process of claim 11, wherein said polyfunctional amine is triaminobenzene.

15. The process of claim 11, wherein said polyfunctional amine is piperazine.

16. The process of claim 1, wherein said polyfunctional acid halide is isophthaloyl halide, terephthaloyl halide, trimesoyl halide or a mixture thereof.

17. The process of claim 16, wherein said polyfunctional acid halide is isophthaloyl chloride.

18. The process of claim 16, wherein said polyfunctional acid halide is terephthaloyl chloride.

19. The process of claim 16, wherein said polyfunctional acid halide is trimesoyl chloride.

20. The process of claim 1, wherein said cross-linked polyamide-based ultra-thin membrane has a thickness of 10-1000 nm.

21. The process of claim 1, wherein said hydrocarbon solvent has a boiling point of not higher than 220° C.

22. The process of claim 1, wherein said hydrocarbon solvent has a boiling point not lower than the boiling point of water.

23. The process of claim 1, wherein the heat of vaporization of said hydrocarbon-based solvent at its boiling point is 60-78 cal/g.

24. The process of claim 1, wherein said hydrocarbon solvent is a $C_8$-$C_{12}$ normal alkane or a mixture thereof.

25. The process of claim 24, wherein said hydrocarbon solvent is n-octane.

26. The process of claim 24, wherein said hydrocarbon solvent is n-nonane.

27. The process of claim 24, wherein said hydrocarbon solvent is n-decane.

28. The process of claim 24, wherein said hydrocarbon solvent is n-undecane.

29. The process of claim 24, wherein said hydrocarbon solvent is n-dodecane.

30. The process of claim 1, wherein said hydrocarbon solvent is ethylcyclohexane.

31. The process of claim 1, wherein said ultra-thin membrane is prepared under a vapor pressure of said hydrocarbon-based solvent of 0.0001-0.02 kg/cm$^2$.

32. The process of claim 1, wherein said gas has a velocity of 3-10 m/sec.

33. The process of claim 1, wherein said gas has a temperature of 20°-40° C.

34. The process of claim 1, wherein said gas has an absolute humidity of not less than 7 g of water per 1 kg of dry gas.

35. The process of claim 1, wherein said gas is nitrogen or a gas containing nitrogen in the amount not less than 70% by volume.

36. The process of claim 35, wherein said gas is air.

37. The process of claim 1, wherein said composite semipermeable membrane is a reverse osmosis membrane.

* * * * *